United States Patent

Ogawa et al.

[11] Patent Number: 5,787,771
[45] Date of Patent: Aug. 4, 1998

[54] METHOD OF AND APPARATUS FOR WORKPIECE LOADING AND UNLOADING IN LATHE

[75] Inventors: Masashi Ogawa, Iwata; Masayuki Tanio, Fukuroi, both of Japan

[73] Assignee: NTN Corporation, Osaka, Japan

[21] Appl. No.: 752,006

[22] Filed: Nov. 15, 1996

[30] Foreign Application Priority Data

Nov. 17, 1995 [JP] Japan .................................. 7-323791

[51] Int. Cl.⁶ .................................................. B23B 5/00
[52] U.S. Cl. ........................... 82/1.11; 82/102; 82/125; 414/222
[58] Field of Search ............................. 82/1.1, 124, 125, 82/121; 414/222, 225

[56] References Cited

U.S. PATENT DOCUMENTS

| | | | |
|---|---|---|---|
| 3,771,390 | 11/1973 | Carignan | 82/102 |
| 4,355,938 | 10/1982 | Page | 414/222 |
| 5,347,896 | 9/1994 | Jones | 82/125 |
| 5,704,262 | 1/1998 | Baumbusch | 82/124 |

*Primary Examiner*—Daniel W. Howell
*Assistant Examiner*—Mark Williams
*Attorney, Agent, or Firm*—Birch, Stewart, Kolasch and Birch, LLP

[57] ABSTRACT

In a lathe of a type employing a movable main spindle, the main spindle (2) is moved in a leftward and rightward direction (Y-axis direction) perpendicular to the longitudinal axis of the main spindle (2) after a workpiece (W) has been machined, and during the movement of the main spindle (2), the machined workpiece (W) is unloaded from the main spindle (2). At a position to which the main spindle (2) has further been moved, another workpiece (W) to be subsequently machined is loaded on the main spindle (2). The unloading of the machined workpiece (W) is carried out by a method in which the machined workpiece (W) is ejected by a workpiece eject means (7) built in a chuck (2a) in the main spindle (2).

7 Claims, 4 Drawing Sheets

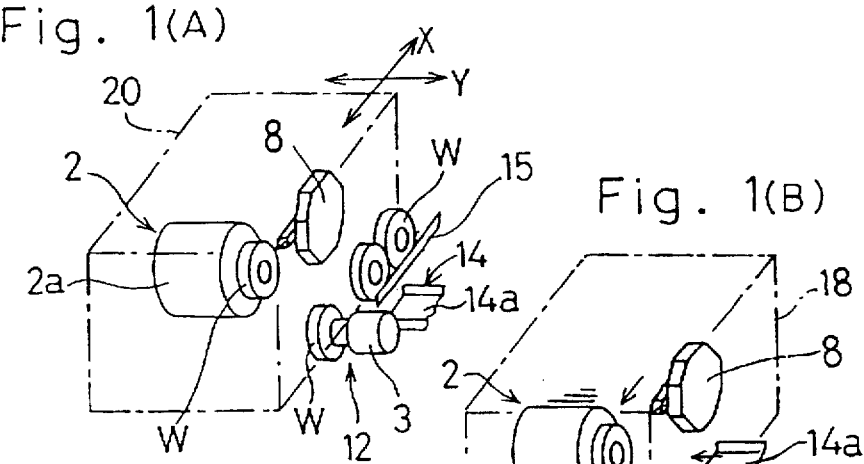
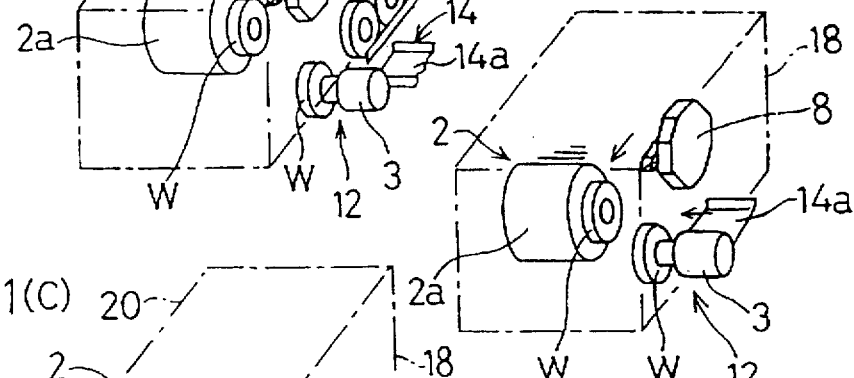
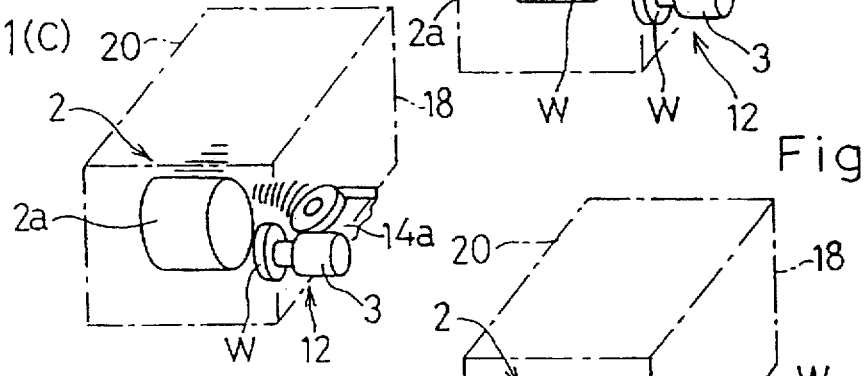
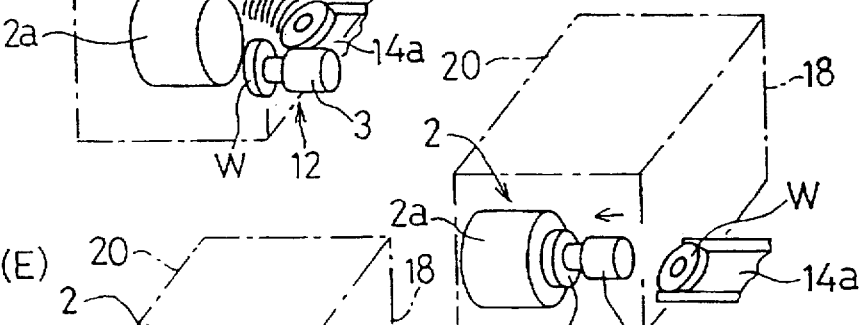
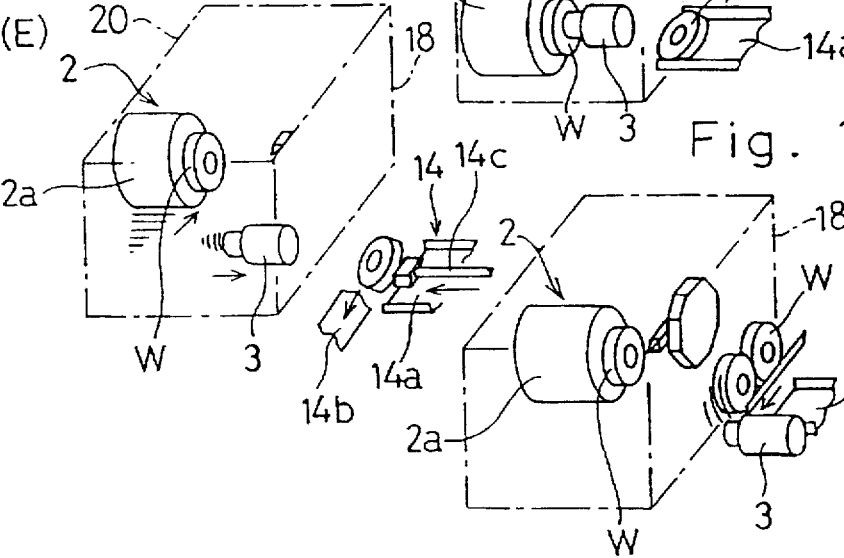

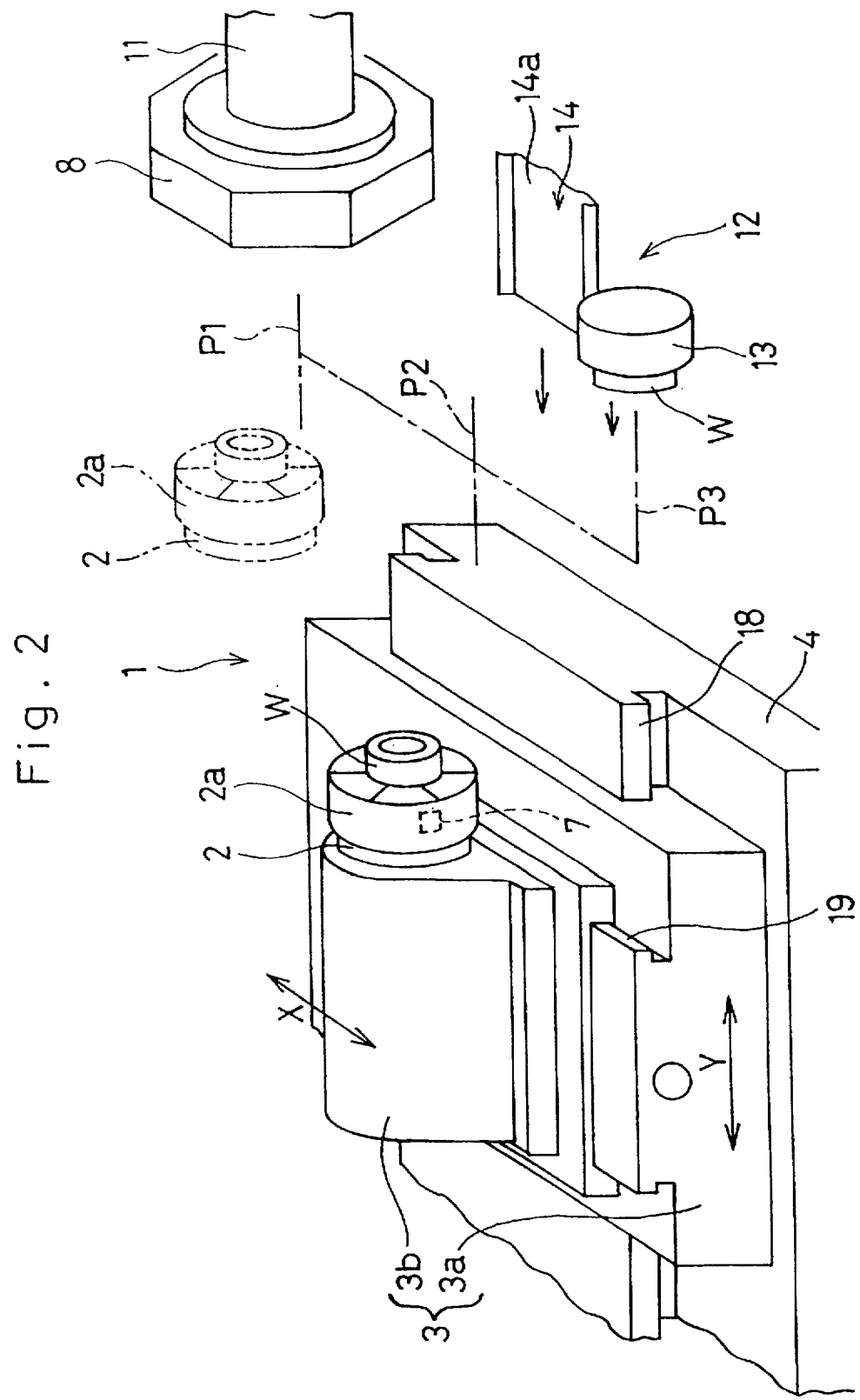

METHOD OF AND APPARATUS FOR WORKPIECE LOADING AND UNLOADING IN LATHE

BACKGROUND OF THE INVENTION

1. (Field of the Invention)

The present invention generally relates to a lathe and, more particularly, to a method of and an apparatus for loading and unloading a workpiece to be machined in the lathe of a type having a main spindle movable in a leftward and rightward direction perpendicular to the longitudinal axis of the main spindle.

2. (Description of the Prior Art)

When it comes to loading of a workpiece to be machined in a lathe, it is an important concern how quickly the workpiece can be selectively loaded and unloaded in and from the lathe in a stable manner. Most of currently utilized lathes are of a type wherein the main spindle is fixed in position and a tool rest such as a turret is movable. When the lathe of the type employing the fixed main spindle is equipped with a workpiece loading apparatus, workpiece loading and unloading are selectively carried out in such a manner as shown in FIGS. 4A to 4J to avoid any possible interference among various component parts of the system.

When a workpiece W gripped by a chuck mounted on a main spindle 51 for rotation together therewith is completely machined as shown in FIG. 4A, a tool rest 52 in the form of a turret is retracted as shown in FIG. 4B, followed by a loading operation performed by a loader 53 of a type including upper and lower loader chucks 54 positioned one above the other. After the loader 53 including the upper and lower loader chucks 54 has been lowered as shown in FIG. 4C towards a position in front of the main spindle 51, the loader 53 is advanced to allow the lower loader chuck 54 to grip the machined workpiece W as shown in FIG. 4D and is subsequently retracted to unload the machined workpiece W as shown in FIG. 4E. Thereafter, the loader 53 is further lowered as shown in FIG. 4F and is then advanced to allow the next succeeding workpiece W, then gripped by the upper loader chuck 54, to be loaded on the main spindle 51 as shown in FIG. 4G. After the next succeeding workpiece W has been loaded on the main spindle 51 as shown in FIG. 4G, the loader 53 is retracted as shown in FIG. 4H and is subsequently retracted upwardly as shown in FIG. 4I. The tool rest 52 is then advanced to start machining of the next succeeding workpiece W as shown in FIG. 4J.

According to the prior art such as discussed with reference to FIGS. 4A to 4J, since the main spindle 51 is fixed in position, the workpiece loading and unloading one at a time take place at one location. At this time, in order to avoid any possible interference between the loader 53 and the tool rest 52 or any other component parts, time is needed for the tool rest 52 to retract as shown in FIG. 4B.

Also, during a transit from the unloading to the subsequent loading, the loader must be lowered, taking a substantial time. Because of those times required to allow the tool rest 52 to retract and also to allow the loader 53 to be lowered, a substantial amount of time is needed to accomplish the loading and unloading and, consequently, the cycle time is undesirably prolonged.

In addition to the lathe of the type utilizing the fixed main spindle as discussed above, a lathe of a type in which the main spindle is movable is also well known in the art. Even in the lathe of the type employing the movable main spindle, the main spindle need be moved between loading and unloading positions to accomplish the loading and the unloading, respectively, and accordingly, the loading and unloading take a substantial amount of time.

SUMMARY OF THE INVENTION

Accordingly, the present invention has been devised to minimize or substantially eliminate the necessity of time required to avoid any possible interference between the tool rest and the loader and, also, to minimize or substantially eliminate the necessity of time spent during the transit from the unloading to the subsequent loading, thereby to reduce the time required to accomplish the loading and unloading of the workpiece in the lathe.

Another important object of the present invention to simplify the loading and unloading apparatus used in the lathe.

In order to accomplish these objects, one aspect of the present invention provides a method of selectively loading and loading a workpiece to be machined in a lathe of a type comprising a main spindle movable in a leftward and rightward direction perpendicular to a longitudinal axis of the main spindle. This loading and unloading method comprising driving the main spindle in such direction after machining of the workpiece has been completed; unloading the workpiece, which has been machined, from the main spindle during movement of the main spindle; and loading a workpiece to be subsequently machined on the main spindle at a loading position to which the main spindle has been moved.

Another aspect of the present invention provides an apparatus for selectively loading and unloading a workpiece to be machined in a lathe of a type comprising a main spindle movable in a leftward and rightward direction perpendicular to a longitudinal axis of the main spindle. This loading and unloading apparatus comprises a drive means for driving the main spindle in such leftward and rightward direction; a movement control means for controlling such drive means to move the main spindle in such leftward and rightward direction after machining of the workpiece has been completed; an unloader for unloading the workpiece, which has been machined, from the main spindle during movement of the main spindle; and a loader for loading a workpiece to be subsequently machined on the main spindle at a position to which the main spindle has been moved.

According to the present invention, by the utilization of the movement of the main spindle, the workpiece W is unloaded during the movement of the main spindle. Therefore, not only is no time is spent for the tool rest 8 to complete its retracting movement, but also the length of the transit time during which the unloading of the machined workpiece is followed by the loading of the next succeeding workpiece can be reduced. Accordingly, the length of the loading and unloading cycle time is reduced advantageously.

Also, since the unloading operation, the loading operation and the movement of the main spindle are carried out by the respective, independent drive systems, no wait time is needed for those operations to take place in succession and, therefore, the loading and unloading cycle time can further be reduced.

Moreover, the loading and unloading means need not be a complicated mechanism designed to perform both of those functions and may suffice to perform a single operation, making it possible to simplify the apparatus.

According to the present invention, the unloading of the workpiece may be carried out by means of a workpiece eject means built in a chuck provided on the main spindle. In such case, no time such as taken by the movement of the chuck employed in the prior art loader is needed, allowing the length of time required to accomplish the workpiece unloading to be further reduced.

Where the machined workpiece is ejected from the main spindle in the manner described above, it is preferred that the ejected workpiece can be received by a workpiece eject passage such as, for example, a chute for receiving the ejected workpiece. In such case, since the workpiece unloading takes place during the movement of the main spindle, the presence of the workpiece eject passage will not interfere with the workpiece unloading, in contrast to the case in which the workpiece unloading takes place at the machining position.

The loader may be rotated during the workpiece loading while the main spindle continues to rotate and for rotating the workpiece to be subsequently machined in synchronism with rotation of the main spindle. By so doing, the main spindle need not be intermittently driven and can resume a predetermined stable rotation even when the main spindle is quickly returned to the machining position.

BRIEF DESCRIPTION OF THE DRAWINGS

In any event, the present invention will become more clearly understood from the following description of a preferred embodiment thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIGS. 1A to 1F are schematic perspective views of a loading and unloading apparatus employed in a lathe according to a preferred embodiment of the present invention, showing the sequence of operation of the loading and unloading apparatus;

FIG. 2 is an exploded view of the loading and unloading apparatus in the lathe according to the embodiment of the present invention;

DETAILED DESCRIPTION OF THE PREFERRED EMBODIMENT

Figure 3:
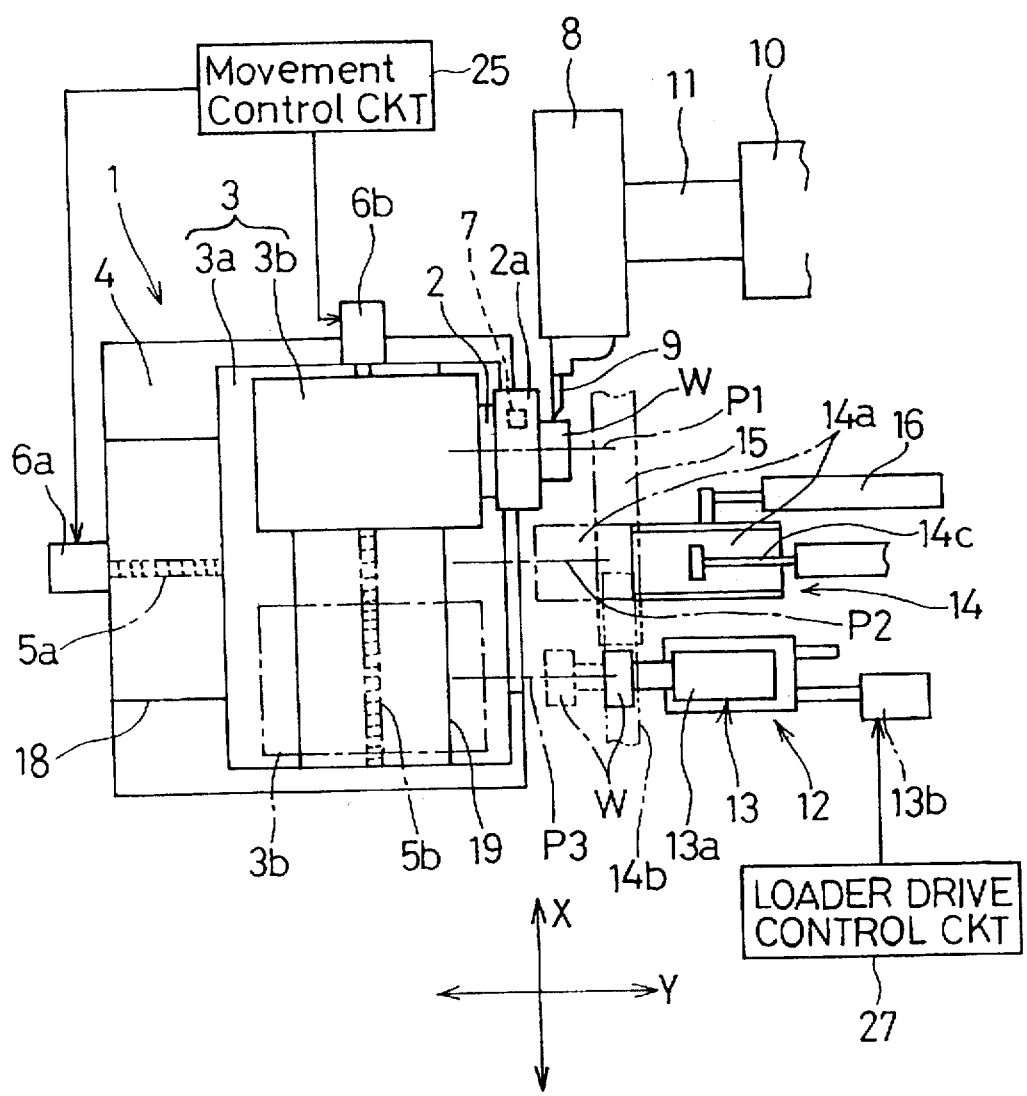
FIG. 3 is a schematic top plan view of the loading and unloading apparatus.
Figure 4A:
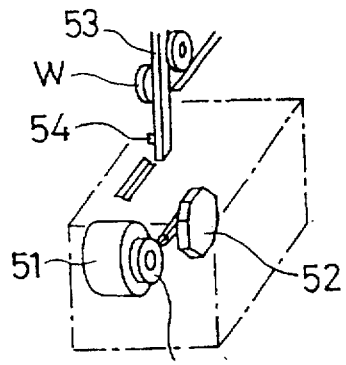
FIGS. 4A to 4J are schematic perspective views of the prior art loading and unloading apparatus in the lathe.
Figure 4B:
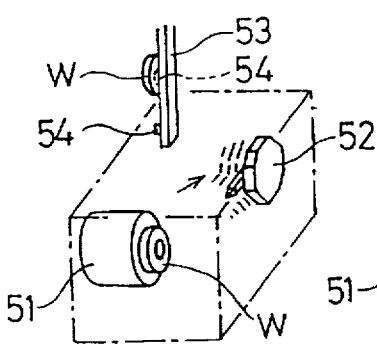
Figure 4C:
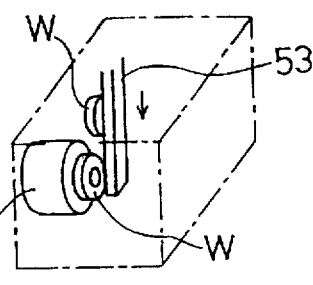
Figure 4D:
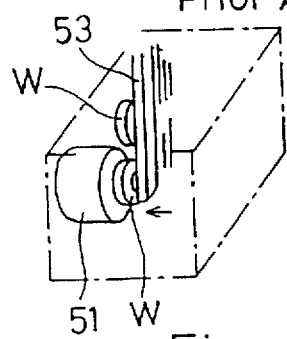
Figure 4E:
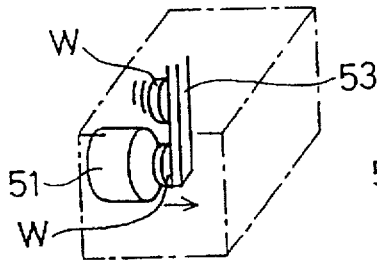
Figure 4F:
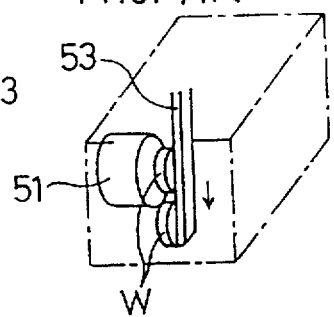
Figure 4G:
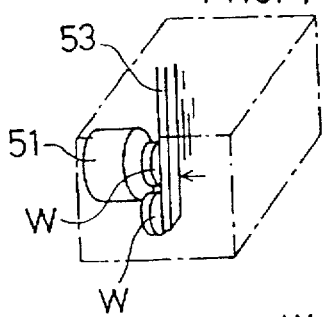
Figure 4H:
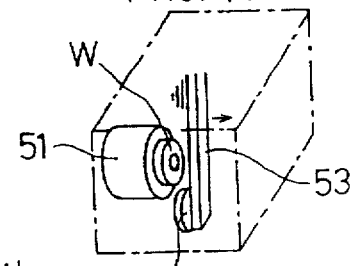
Figure 4I:
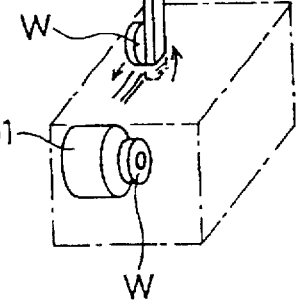
Figure 4J:
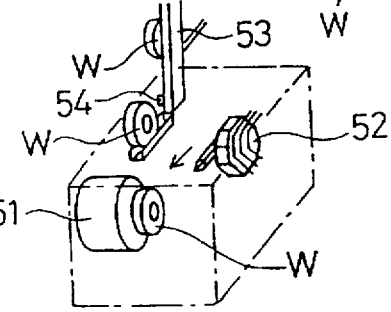

A loading and unloading apparatus for selectively loading and unloading a workpiece in a lathe according to a preferred embodiment of the present invention will now be described with reference to the accompanying drawings. Referring first to FIG. 2, the lathe generally identified by 1 is in the form of a turret lathe of a type employing a movable main spindle. The illustrated lathe 1 comprises a main spindle 2 drivingly mounted on a movable headstock 3. The movable headstock 3 comprises a main spindle support base 3a guided by guides 18 on a bed 4 for movement forwards and rearwards in a Y-axis direction parallel to the longitudinal axis of the main spindle 1 and a main spindle support body 3b guided by guides 19, formed in the main spindle support base 3a, for movement in a leftward and rightward direction (an X-axis direction) perpendicular to the longitudinal axis of the main spindle 1, that is, perpendicular to the Y-axis direction. The main spindle support base 3a is drivingly coupled with a drive device 6a such as, for example, a drive motor, by means of a feed screw mechanism 5a such as, for example, a ball-and-screw feeder, for reciprocate movement in the Y-axis direction whereas the main spindle support body 3b is similarly drivingly coupled with a drive device 6b such as, for example, a drive motor, by means of a feed screw mechanism 5b such as, for example, a ball-and-screw feeder, for reciprocate movement in the X-axis direction. The drive devices 6a and 6b are controlled by a programmed movement control circuit 25. On the other hand, the main spindle 2 includes a chuck 2a mounted thereon for movement together therewith, and a workpiece eject means 7 built in the chuck 2a for ejecting a workpiece W, gripped by the chuck 2a, when the latter is opened.

The workpiece eject means 7 may be of either a type capable of ejecting the workpiece W by the utilization of a spring element or a type employing a hydraulic drive for ejecting the workpiece W. In the case of the type employing the spring element, the spring may be compressed to accumulate a pushing force when the workpiece W is fitted to the chuck 2a on the main spindle 2 so that, when the chuck 2a is eventually opened, the spring element exerts the accumulated pushing force to eject the workpiece W. In the case of the type employing the hydraulic drive, the hydraulic drive may be so designed as to be activated simultaneously with opening of the chuck 2a to eject the workpiece W. The workpiece W to be selectively loaded and unloaded on and from the lathe by the loading and unloading apparatus of the present invention may include, for example, a ring-shaped element which may be employed as an outer race for a rolling contact bearing, a disc-shaped element or a round rod.

A tool rest 8 employed in the illustrated embodiment is fixed in position and comprises a turret which is disposed in face-to-face relationship with the main spindle 2 as shown in FIG. 3 and has a peripheral surface on which a plurality of machining tools 9 such as bites are fixedly mounted. The turret-type tool rest 8 is supported by a turret support 10 by means of a turret bar 11 for intermittent rotation about the longitudinal axis of the turret bar 11. Specifically, this turret-type tool rest 8 can be indexed to bring the machining tools 9 to an operative position one at a time. Feed and cutting of the workpiece W are carried out by driving the movable headstock 3 in one or both of the Y-axis and X-axis directions to bring the workpiece W into alignment with one of the machining tools 9 then held at the operative position. It is to be noted that although in the illustrated embodiment the tool rest 8 is fixed in position relative to the movable headstock 3, it may be so designed and so supported as to be movable in a direction parallel to the longitudinal axis of the main spindle 2.

A loading and unloading apparatus is generally shown by 12 and comprises, in addition to the workpiece eject means 7 built in the chuck 2a, a loader 13, a workpiece eject passage 14 through which the workpiece W is ejected, and a workpiece supply passage 15 through which workpieces W are supplied one at a time. The workpiece eject passage 14 is disposed at an unloading position P2 spaced a distance from a machining position P1, where the main spindle 2 is held in the vicinity of the tool rest 8, in a direction parallel to the X-axis direction. On the other hand, the loader 13 is disposed at a loading position P3 spaced somewhat further distance from the unloading position P2 and on one side of the unloading position P2 opposite to the machining position P1.

The workpiece eject passage 14 is comprised of a movable recovery bucket 14a, a chute 14b and a pusher means 14c. The movable recovery bucket 14a is drivingly coupled with a drive mechanism 16 such as, for example, an air cylinder, so as to move from a workpiece receiving station shown by the phantom line in FIG. 3 to a retracted station shown by the solid line in FIG. 3 such that, when the movable recovery bucket 14a is moved to the workpiece receiving station, the movable recovery bucket 14a is held at a position immediately beneath a path along which the workpiece W gripped by the chuck 2a on the main spindle 2 moves. The pusher means 14c is operable to push the workpiece W on the movable recovery bucket 14a onto the chute 14b. The workpiece eject passage 14 although it has been described as comprising the movable recovery bucket 14a, the chute 14b and the pusher means 14c, may alternatively comprise a single chute or a conveyor.

The loader 13 comprises a loader body 13a including a loader chuck for retaining the ring-shaped workpiece W by expanding chuck pawls radially outwardly to engage an inner peripheral surface of the ring-shaped workpiece W and a drive motor for driving such loader chuck, and a loader drive mechanism 13b for driving the loader body 13a. The loader drive mechanism 13b includes a guide means for reciprocatingly guiding the loader body 13a in a direction parallel to the Y-axis direction, and a drive source such as a motor for driving the loader body 13a by means of a feed mechanism such as, for example, a ball-and-screw feeder. The drive source is controlled by a programmed loader drive control circuit 27. The workpiece supply passage 15 defines a workpiece supply path through which the workpiece W can be supplied to the loader chuck of the loader 13 then held at a retracted position and comprises a chute or the like along which the workpiece W rolls downwardly.

It is to be noted that the area ranging between the machining position P1 to the loading position P3 is enclosed by a machine covering 20 shown by the single-dotted chain line in FIGS. 1A to 1J. The lathe 1 and the loading and unloading apparatus 12 are automated with their operation controlled by a NC (numeric control) unit.

A method of selectively loading and unloading a workpiece W to be machined in the lathe will now be described with particular reference to FIGS. 1A to 1J. When the workpiece W gripped by the chuck 2a on the main spindle 2 is completely machined as shown in FIG. 1A, the main spindle 2 is moved in the X-axis direction together with the movable headstock 3 as shown in FIG. 1B to initiate unloading of the machined workpiece W and subsequent loading of the next succeeding workpiece W to be machined. At this time, the loading and unloading apparatus 12 is still under operation, and when the main spindle 2 is moved to the unloading position P2 shown in FIG. 3, the chuck 2a on the main spindle 2 is opened, followed by ejection of the machined workpiece W by means of the workpiece eject means 7, thereby completing the unloading of the machined workpiece W as shown in FIG. 1C. Prior to completion of the unloading of the machined workpiece W, the movable recovery bucket 14a of the workpiece eject passage 14 is advanced to the position shown by the single-dotted chain line shown in FIG. 3 and is then held still there. The machined workpiece W ejected from the chuck 2a of the main spindle 2 is then received by the movable recovery bucket 14a of the workpiece eject passage 14.

While the above described unloading takes place, the main spindle 2 continue its movement without being halted and, when the main spindle 2 is accordingly moved to the loading position P3, the main spindle 2 is held still and, on the other hand, the loader 13 is advanced to perform the loading of the next succeeding workpiece W to be machined as shown in FIG. 1D. During this loading, while the main spindle 2 continues its rotation about the longitudinal axis thereof, the next succeeding workpiece W is rotated in synchronism with rotation of the main spindle 2. By so doing, the rotation of the main spindle 2 need not be interrupted and, therefore, even when the main spindle 2 subsequently return to the machining position P1 quickly, the shaft 2 can resume a predetermined stable rotation there, and accordingly, machining of the next succeeding workpiece W can readily be carried out.

Upon completion of the loading of the next succeeding workpiece W, the main spindle 2 returns to the machining position P1 as shown in FIG. 1E and the loading and unloading apparatus 12 operates to cause the pusher means 14c to push the workpiece W on the movable recovery bucket 14a then moved to the retracted position. Subsequently, machining of the workpiece W carried by the main spindle 2 starts and, on the other hand, the loader 13 performs setting of the next succeeding workpiece W as shown in FIG. 1F. In other words, the next succeeding workpiece W supplied through the workpiece supply passage 15 is retained by the loader chuck.

According to the workpiece loading and unloading method described above, since by the utilization of the movement of the main spindle 2 the workpiece W is unloaded during the movement of the main spindle 2, not only is no time is spent for the tool rest 8 to complete its retracting movement, but also the length of the transit time during which the unloading of the machined workpiece W is followed by the loading of the next succeeding workpiece W can be reduced. Accordingly, the length of the loading and unloading cycle time is reduced advantageously. Also, since the unloading operation, the loading operation and the movement of the main spindle 2 are carried out by the respective, independent drive systems, no wait time is needed for those operations to take place in succession and, therefore, the loading and unloading cycle time can further be reduced. Moreover, the loading and unloading means need not be a complicated mechanism designed to perform both of those functions and may suffice to perform a single operation, making it possible to simplify the apparatus.

Although the present invention has been fully described in connection with the preferred embodiment thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A method of selectively loading and unloading a workpiece to be machined in a lathe of a type comprising a main spindle movable in a leftward and rightward direction perpendicular to a longitudinal axis of the main spindle, said method comprising the steps of:

driving the main spindle in one of said leftward and rightward directions after machining of the workpiece has been completed;

unloading the workpiece, which has been machined, from the main spindle during movement of the main spindle; and loading a workpiece to be subsequently machined on the main spindle at a loading position to which the main spindle has been moved.

2. The loading and unloading method as claimed in claim 1, wherein the step of unloading the workpiece is carried out by means of a workpiece eject means built in a chuck provided on the main spindle.

3. The loading and unloading method as claimed in claim 1, wherein the step of loading the workpiece to be subsequently machined is carried out by rotating the workpiece in synchronism with rotation of the main spindle while the main spindle continues to rotate.

4. An apparatus for selectively loading and unloading a workpiece to be machined in a lathe of a type comprising a main spindle movable in a leftward and rightward direction perpendicular to a longitudinal axis of the main spindle, said apparatus comprising:

a drive means for driving the main spindle in said leftward and rightward direction;

a movement control means for controlling said drive means to move the main spindle in said leftward and rightward direction after machining of the workpiece has been completed;

an unloader for unloading the workpiece, which has been machined, from the main spindle during movement of the main spindle; and a loader for loading a workpiece to be subsequently machined on the main spindle at a position to which the main spindle has been moved.

5. The loading and unloading apparatus as claimed in claim 4, wherein said unloader comprises a workpiece eject means provided in a chuck built in the main spindle.

6. The loading and unloading apparatus as claimed in claim 4, further comprising a loader drive control means for rotating the loader during a loading of the workpiece to be subsequently machined while the main spindle continues to rotate and for rotating the workpiece to be subsequently machined in synchronism with rotation of the main spindle.

7. The loading and unloading apparatus as claimed in claim 4, further comprising a workpiece eject passage for receiving the workpiece, unloaded from the main spindle, and subsequently ejecting the unloaded workpiece, said workpiece eject passage being disposed at an unloading position spaced a distance in the leftward and rightward direction from the machining position, where the main spindle is held in the vicinity of a tool rest.

* * * * *